United States Patent [19]

Abe

[11] 4,227,651
[45] Oct. 14, 1980

[54] NOZZLE FOR USE ON THE EXHAUST OF INTERNAL COMBUSTION ENGINES

[76] Inventor: Luis A. P. Abe, 141 Maule St., Santiagio, Chile

[21] Appl. No.: 59,927

[22] Filed: Jul. 20, 1979

[51] Int. Cl.³ .............................................. B05B 7/06
[52] U.S. Cl. ..................................... 239/428; 60/317; 60/319; 417/159; 239/430; 239/434.5
[58] Field of Search ...................... 239/428, 428.5, 429, 239/430, 434.5; 60/317, 319; 417/159

[56] References Cited

U.S. PATENT DOCUMENTS

| | | | |
|---|---|---|---|
| 1,794,276 | 2/1931 | Bowes | 60/319 X |
| 1,813,189 | 7/1931 | Moore | 239/430 X |
| 3,857,458 | 12/1974 | Ohtani et al. | 60/319 X |
| 4,178,760 | 12/1979 | Alf et al. | 60/319 |

FOREIGN PATENT DOCUMENTS 281446  1/1931  Italy ......................................... 60/317

Primary Examiner—Robert B. Reeves
Assistant Examiner—Michael J. Forman

[57] ABSTRACT

A nozzle for use on the exhaust of an internal combustion engine having converging and diverging conical sections designed to improve combustion efficiency by accelerating the expulsion of exhaust gases.

1 Claim, 2 Drawing Figures

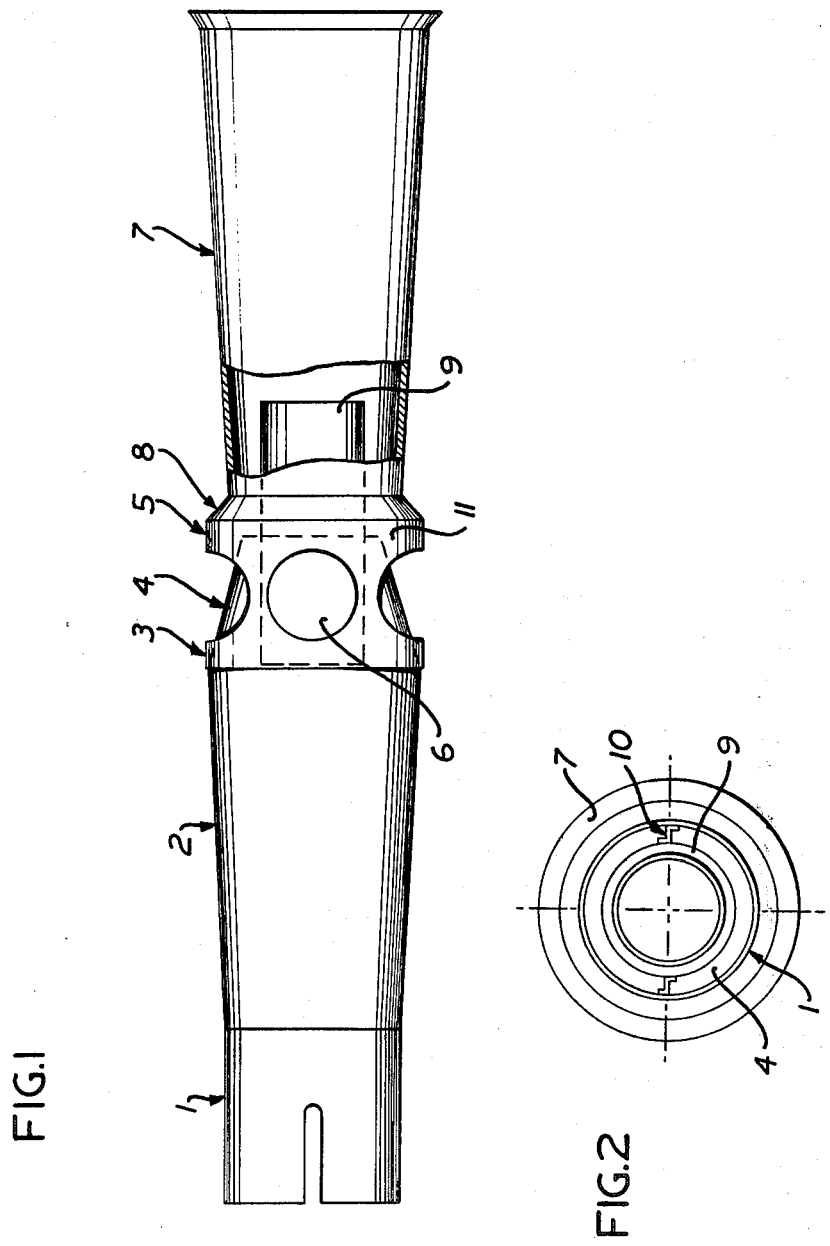

NOZZLE FOR USE ON THE EXHAUST OF INTERNAL COMBUSTION ENGINES

The present invention relates to an end nozzle to be used on the exhaust of an internal combustion engine.

The main purpose of the invention is a simple construction element, without moving parts subject to replacement, which is capable of accelerating the exhaust of gaseous fluids produced by the internal combustion engine.

As a consequence of the indispensable muffler used on the exhaust system of internal combustion engines, and especially those of automotive vehicles, the carbon and soot accumulation due to the lapse of time, the curvatures of the exhaust pipe, and the constrictions of the exhaust pipe due to residue, the engine does not expel the combustion gases in the necessary amount and with due speed. This produces a reduction in the engine's performance, and due to choking, an incomplete combustion, with the natural consequences affecting cylinders and valves.

In order to overcome the above problem it is an object of the invention to provide an exhaust nozzle which can be used on engines having one or two outlets, thus obtaining a more rapid and efficient evacuation of the gases produced to result in less pollution, and with a lower content of carbonmonoxide.

The preferred embodiment of the invention disclosed herein is an exhaust nozzle capable of accelerating the gases expelled by the engine.

The preferred embodiment of the invention will now be described with reference to the accompanying drawings in which:

FIG. 1, is an external side elevation view of a nozzle; and

FIG. 2, is a right-hand elevation of the nozzle.

According to FIG. 1, the nozzle includes a first nozzle part having a cylindrical inlet section 1 which has couplings for attachment to the engine's exhaust pipe (not shown). Coaxially continuing from cylindrical inlet section 1, is a gradually expanding conical section 2 having a maximum diameter portion 3 which forms a junction with a gradually narrowing coaxial conical section 4. A second nozzle part having a cylindrical end 5 is coaxially connected at portion 3 with the first nozzle part and receives conical section 4 therein. A plurality of holes 6 are peripherally spaced about the periphery of cylindrical end 5 in the area of conical section 4.

Joined to cylindrical end 5 of the second nozzle part is a divergent conical section 7 of a certain length, having a minimum diameter throat 8.

A short tube 9 is coaxially supported at the location shown inside of the first and second nozzle parts. The tube 9 has a length extending approximately from maximum diameter portion 3 through conical section 4 and into conical section 7. Tube 9 is held in place by radial supports 10 connected as by welding to the inside surface of the first or the second nozzle part.

OPERATION

The gases enter the nozzle at inlet section 1 at a certain pressure determined by the engine and the shape and cross section of the exhaust pipe and muffler where they suddenly expand within expanding conical section 2, following which they are compressed by the narrowing conical section 4. Some of the exhaust gases flow around the co-axial tube 9 and the rest flow through the co-axial tube 9. The vacuum produced by the passage of exhaust gases around tube 9 introduces ambient air through the holes 6 and into an air inlet throat 11 located between the small diameter outlet end of conical section 4 and cylindrical end 5.

Upon passage through throat 11, the ambient air introduced through the holes 6 creates a low pressure condition due to the venturi effect to accelerate the passage of gases through tube 9.

Thus, as described, the natural deficiency of the internal combustion engine can be eliminated in the last cycle of its work, that is to say in the exhaust period. The measures of delaying the closing of valves and speeding up their aperture is not enough to totally expel the residual gases. The presence of residual gases is due to the uniform retarded speed of the pistons toward the top dead center of their stroke, thus reducing their capacity for expelling exhaust gases. At this point, the inlet air/fuel mixture sucked in always meets unexpelled residual gases which thus lowers the efficiency of the combustion due to contamination of the explosive mixture. This delays the speed of ignition and also produces a reduction in power. In addition, incomplete combustion results in clogging of the exhaust system. If the firing order is 1-3-4-2, a reciprocating action exists through the exhaust manifold from cylinder 3 toward cylinder 1, from cylinder 4 toward cylinder 3, from cylinder 2 toward cylinder 4, and from cylinder 1 toward cylinder 2, due to back pressure, and consequently incrementing the amount of residual gases in the cylinder, thus increasing the ratio of contamination of the combustion mixture and inert gases.

The above problems, which have long plagued the industry, have not been solved to date and are substantially overcome by the present invention. No major corrections or additions to the engine are required and the nozzle defined herein needs merely to be attached to the end section of the exhaust pipe.

It will be appreciated that modifications and departures from the preferred embodiment described herein can be made and the scope of protection is to be defined only by the appended claims.

What I claim is:

1. A nozzle for use on the exhaust of an internal combustion engine comprising: a first nozzle part having an inlet end, a diverging conical section axially aligned with the inlet end, a converging conical section aligned with the diverging conical section; a second nozzle part axially aligned with said first nozzle part and affixed thereto at the junction between the two conical sections of the first nozzle part, the second nozzle part having a cylindrical air inlet end provided with a plurality of peripheral holes, said air inlet end surrounding and spaced from the converging conical section of the first nozzle part, a converging conical section axially aligned with said cylindrical air inlet, and a diverging conical outlet section axially aligned with said converging conical section; and a cylindrical tube supported axially within the first and second nozzle parts and axially extending from approximately the junction between the two conical sections of the first nozzle part to a location in the second nozzle part between the ends of the diverging conical section thereof.

* * * * *